United States Patent
Matsuyama et al.

(10) Patent No.: US 7,147,275 B2
(45) Date of Patent: Dec. 12, 2006

(54) FRONT PART STRUCTURE OF VEHICLE BODY

(75) Inventors: Shohei Matsuyama, Wako (JP); Eric J. Boettcher, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 40 days.

(21) Appl. No.: 11/167,532

(22) Filed: Jun. 27, 2005

(65) Prior Publication Data

US 2006/0006699 A1    Jan. 12, 2006

(30) Foreign Application Priority Data

Jul. 7, 2004    (JP)    ............................. 2004-200180

(51) Int. Cl.
B62D 25/08    (2006.01)

(52) U.S. Cl. ........................... 296/203.02; 296/187.09; 296/192

(58) Field of Classification Search .......... 296/203.02, 296/203.01, 193.02, 192, 187.03, 187.09, 296/187.1
See application file for complete search history.

(56) References Cited

U.S. PATENT DOCUMENTS 5,244,248 A * 9/1993 Bovellan ............... 296/187.09

FOREIGN PATENT DOCUMENTS

| DE | 43 04 920 A1 | * | 9/1993 |
| JP | 030-32986 A | * | 2/1991 |
| JP | 2003-182633 | | 7/2003 |

* cited by examiner

Primary Examiner—Dennis H. Pedder
Assistant Examiner—Michael Hernandez
(74) Attorney, Agent, or Firm—Rankin, Hill, Porter & Clark LLP

(57) ABSTRACT

A vehicle body includes a front part having a dashboard. The dashboard has an upper end portion bulged in a rearward direction of the vehicle body. The bulged upper end portion covers an upper portion of a rear reinforcing member with a constant interval provided therebetween. The bulged upper end portion is joined to an upper member and a damper housing. The bulged upper end portion and the rear reinforcing member are combined together to form a closed cross-sectional member directed towards a front pillar and extending from a side frame to the upper member. The rear reinforcing member extends from a lower joining portion located forwardly of a lower part of the dashboard through inside of the bulged upper end portion to the upper member. The rear reinforcing member takes the form of a generally straight line, as viewed in all of front elevation, top plan and side elevation.

3 Claims, 8 Drawing Sheets

FRONT PART STRUCTURE OF VEHICLE BODY

FIELD OF THE INVENTION

The present invention relates to an improvement in a front part structure of a vehicle body for dispersing a collision energy applied to the front part from a front side of the vehicle body.

BACKGROUND OF THE INVENTION

Vehicle bodies of vehicles such as automobiles include right and left front side frames disposed on right and left sides of front parts of the vehicle bodies and extending in a front-and-rear direction of the vehicle bodies. In recent years, structures of the front parts of the vehicle bodies have been developed to distribute to front pillars collision energies applied to the front side frames from front sides of the vehicle bodies, as disclosed in JP-A-2003-182633, so as to reduce burdens to be borne by rear end portions of the front side frames.

Figure 8A:
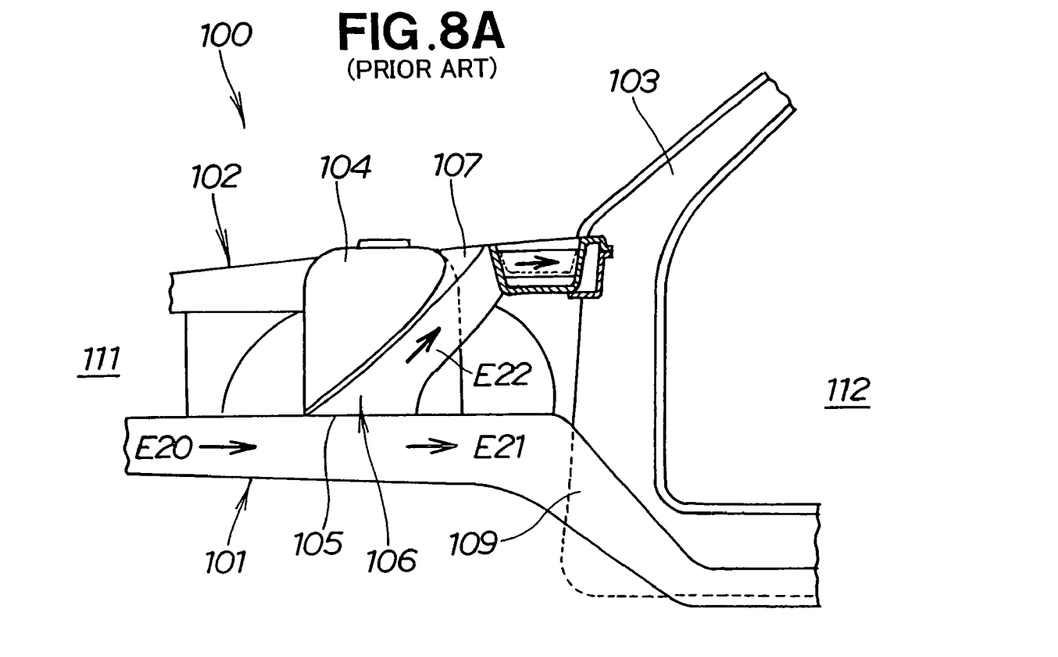
FIG. 8A is a view showing a right half of a front part of a conventional vehicle body, as viewed from a transverse center of the vehicle body.
Figure 8B:
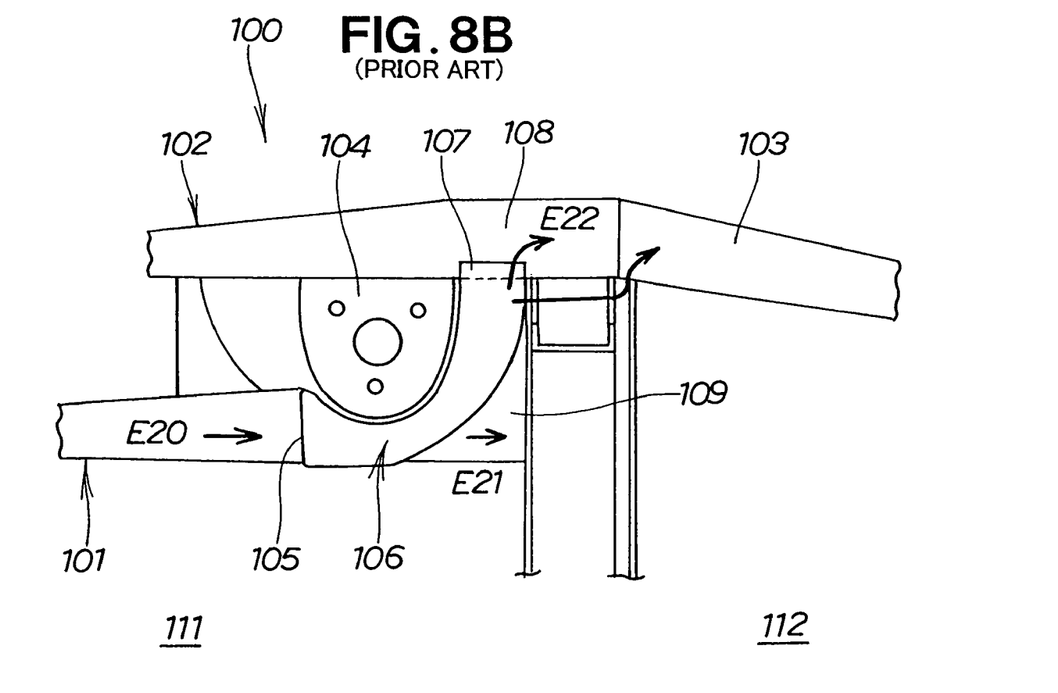
FIG. 8B is a top plan view of the right half of the front part of the conventional vehicle body.

FIG. 8A and FIG. 8B hereof show a right half of a front part of a conventional vehicle body 100 shown in JP-A-2003-182633. The vehicle body 100 includes right and left front side frames 101 disposed on right and left sides of a front part thereof, respectively, and extending in a front-and-rear direction of the vehicle body 100, and right and left front upper members 102 disposed transversely outwardly of and above the right and left front side frames 101, respectively, and extending in the front-and-rear direction of the vehicle body 100. The right and left front upper members 102 have rear end portions joined to right and left front pillars 103, respectively. A right front damper housing 104 extends between the right front side frame 101 and the right front upper member 102. Similarly, a left front damper housing (not shown) extends between the left front side frame and the left front upper member. The right front side frame 101 is joined to the right front damper housing 104 at a light joining portion 105. A right gusset 106 extends rearwardly upwardly from the right joining portion 105 along the right front damper housing 104. The right gusset 106 has a rear end portion 107 joined to a rear end portion 108 of the right front upper member 102. Similarly, the left front side frame is joined to the left front upper member at a left joining portion (not shown). A left gusset (not shown) extends rearwardly upwardly from the left joining portion along the left front damper housing and has a rear end portion (not shown) joined to a rear end portion of the left front upper member.

The right and left gussets are curved along the right and left damper housings 104, respectively, for reinforcing the right and left damper housings 104. A collision energy E20 applied to the front side frame 101 from a front side of the vehicle body is divided into a collision energy E21 to be transmitted to the rear end portion 109 of the front side frame 101, and a collision energy E22 to be transmitted to the front pillar 103 through the gusset 106 and the front upper member 102. As a result, the collision energy E21 to be transmitted to the rear end portion 109 of the front side frame 101 can become small.

For the conventional vehicle body 100, the front damper housing 104 can be reinforced while the collision energy E20 can be distributed to the front pillar 103. However, because the gusset 106 serving to distribute the collision energy E20 applied to the front side frame from the front side of the vehicle body 100 has the curved configuration, distribution of the collision energy to the front pillar 103 is less efficiently effected.

The front part of the vehicle body 100 is partitioned by a dashboard (not shown) into an engine compartment 111 defined forwardly of the dashboard and a passenger compartment 112 defined rearwardly of the dashboard. In recent years, vehicles tend to have enlarged passenger compartments for providing passengers with comfortableness. To enlarge the passenger compartment, the dashboard should be shifted as forwardly as possible. Therefore, a space between the damper housings 104 and the dashboard is inevitably made very small if the passenger compartment 112 is enlarged. Where only a small or no space is formed between the damper housings and the dashboard, the gussets can not be provided therebetween.

SUMMARY OF THE INVENTION

An object of the present invention is to provide a front part structure of a vehicle body arranged: (1) such that a dashboard for partitioning a front part of the vehicle body into an engine compartment defined forwardly of the dashboard and a passenger compartment defined rearwardly of the dashboard is disposed in a forwardly shifted position so as to enlarge the passenger compartment; (2) such that a collision energy applied to front side frames from a front side of the vehicle body is efficiently distributed to front pillars; and (3) such that front damper housings are reinforced.

According to one aspect of the present invention, there is provided a front part structure of a vehicle body, comprising: right and left front side frames disposed on right and left sides of a front part of the vehicle body, respectively, and extending in a front-and-rear direction of the vehicle body; right and left front upper members disposed transversely outwardly of and above the right and left front side frames, respectively, and extending in the front-and-rear direction of the vehicle body; right and left front pillars joined to right and left rear end portions of the right and left front upper members, respectively; right and left front damper housings extending between the right front side frame and the right front upper member and between the left front side frame and the left upper member, respectively; a dashboard disposed rearwardly of the right and left front damper housings and partitioning the front part of the vehicle body into an engine compartment defined forwardly of the dashboard and a passenger compartment defined rearwardly of the dashboard; right and left reinforcing members extending between the light front upper member and a right joining portion where the right front side frame and the right front damper housing are joined together and between the left front upper member and a left joining portion where the left front side frame and the left front damper housing are joined together, respectively; the right and left reinforcing members being joined to rear parts of the right and left front damper housings therealong; the dashboard being adjacent to the rear parts of the right and left front damper housings; the dashboard having an upper end portion bulged in a rearward direction of the vehicle body, the bulged upper end portion of the dashboard covering each of upper portions of the right and left reinforcing members with a constant interval provided therebetween; the bulged upper end portion of the dashboard being joined to the right and left front upper members and the right and left front damper housings; the right and left reinforcing members being combined with the bulged upper end portion of the dashboard to form right and left closed cross-sectional members, the right closed cross-sectional member being directed towards the right front pillar and extending from the right joining portion to the right front upper member, the left closed cross-sectional member being directed towards the left front pillar and extending from the left joining portion to the left front upper member; and the right and left closed cross-sectional members each taking the form of a substantially straight line as viewed in all of front elevation, top plan and side elevation.

The reinforcing member extends between the front upper member and the joining portion where the front damper housing is joined to the front side frame. The reinforcing member is joined to the rear part of the damper housing therealong. This arrangement of the reinforcing member enables sufficient reinforcement of the front damper housing.

The dashboard has the upper end portion disposed adjacent to the rear part of the front damper housing and bulged in the rearward direction of the vehicle body. The bulged upper end portion of the dashboard covers the upper portion of the reinforcing member with a constant interval provided therebetween. The bulged upper end portion of the dashboard is joined to the front upper member and the front damper housing. The bulged upper end portion is combined with the reinforcing member to form the closed cross-sectional member directed towards the front pillar and extending from the joining portion to the front upper member.

The bulged upper end portion constituting one part of the dashboard forms the closed cross-sectional member in combination with the reinforcing member. The closed cross-sectional member acts as a reinforcing member. The bulged upper end portion of the dashboard constitutes one part of the closed cross-sectional member.

The joining portion where the front damper housing is joined to the front side frame is located forwardly of the dashboard. The bulged upper end portion is bulged rearwardly from a top end of the dashboard. The reinforcing member having a lower end portion joined to the joining portion located forwardly of a lower part of the dashboard extends to inside the bulged upper end portion of the dashboard. Since the reinforcing member extends to the inside of the bulged upper end portion, the reinforcing member can extend between the front side frame and the front upper member on a rear side of the front damper housing while the dashboard is adjacent to the rear part of the front damper housing.

The front part structure of the vehicle body has the following advantages: (1) a collision energy applied to the front side frame from a front side of the vehicle body can be distributed to the front pillar through the reinforcing member and the front upper member; (2) the front damper housing can be reinforced by the reinforcing member; and (3) the dashboard partitioning the front part of the vehicle body into the engine compartment defined forwardly of the dashboard and the passenger compartment defined rearwardly of the dashboard is adjacent to the rear part of the front damper housing so as to enlarge the passenger compartment.

The closed cross-sectional member is the form of a substantially straight line, as viewed in all of front elevation, top plan and side elevation. By virtue of the substantially linearly extending closed cross-sectional member, the collision energy applied to the front side frame from the front side of the vehicle body can be efficiently distributed to the front pillar.

Preferably, the light and left reinforcing members include right and left first reinforcing parts provided inside the right and left front damper housings, respectively, and right and left second reinforcing parts provided outside the right and left front damper housings, respectively, the right second reinforcing part being located oppositely from the right first reinforcing part with a side plate of the right front damper housing interposed therebetween, the left second reinforcing part being located oppositely from the left first reinforcing part with a side plate of the left front damper housing interposed therebetween, the right and left second reinforcing parts being gussets located at the right and left joining portions, the gussets interconnecting an upper portion of the right front side frame and a side portion of the right front damper housing facing towards a transverse center of the vehicle body and interconnecting an upper portion of the left front side frame and a side portion of the left front damper housing facing towards the transverse center of the vehicle body.

The reinforcing member extends from the joining portion, located forwardly of the lower part of the dashboard, through the inside of the bulged upper end portion of the dashboard to the front upper member. The reinforcing member takes the form of the substantially straight line as viewed in all of front elevation, top plan and side elevation, namely, in a three dimensions. Such a reinforcing member can be formed by simple combination of first and second reinforcing parts.

Preferably, the right and left first reinforcing parts include right and left reinforcing lower half portions made of plates and disposed on sides of right and left front side frames, respectively, and right and left reinforcing upper half portions made of plates and disposed on sides of right and left front upper members, respectively, the reinforcing upper half portions being smaller in thickness than the reinforcing lower half portions and the second reinforcing parts made of plates.

With this arrangement, the reinforcing upper half portion is smaller in strength than the reinforcing lower half portion and the second reinforcing part. The reinforcing member has strength suitable for achieving an optimal proportion of collision energy to be distributed from the front side frame to the front pillar to the collision energy applied to the front side frame from the front side of the vehicle body. Thus, the vehicle body can be more freely designed.

BRIEF DESCRIPTION OF THE DRAWINGS

A preferred embodiment of the present invention will hereinafter be described in detail, by way of example only, with reference to the accompanying drawings, in which.

DETAILED DESCRIPTION OF THE PREFERRED EMBODIMENT

In the drawings, only a left half of a front part of a vehicle body is shown. A right half of the front part of the vehicle body has the same arrangement as the left half, and a detailed description as to the right half of the front part of the vehicle body will be omitted. Welding such as spot welding is used for joining together components as explained hereinbelow.

Figure 1:
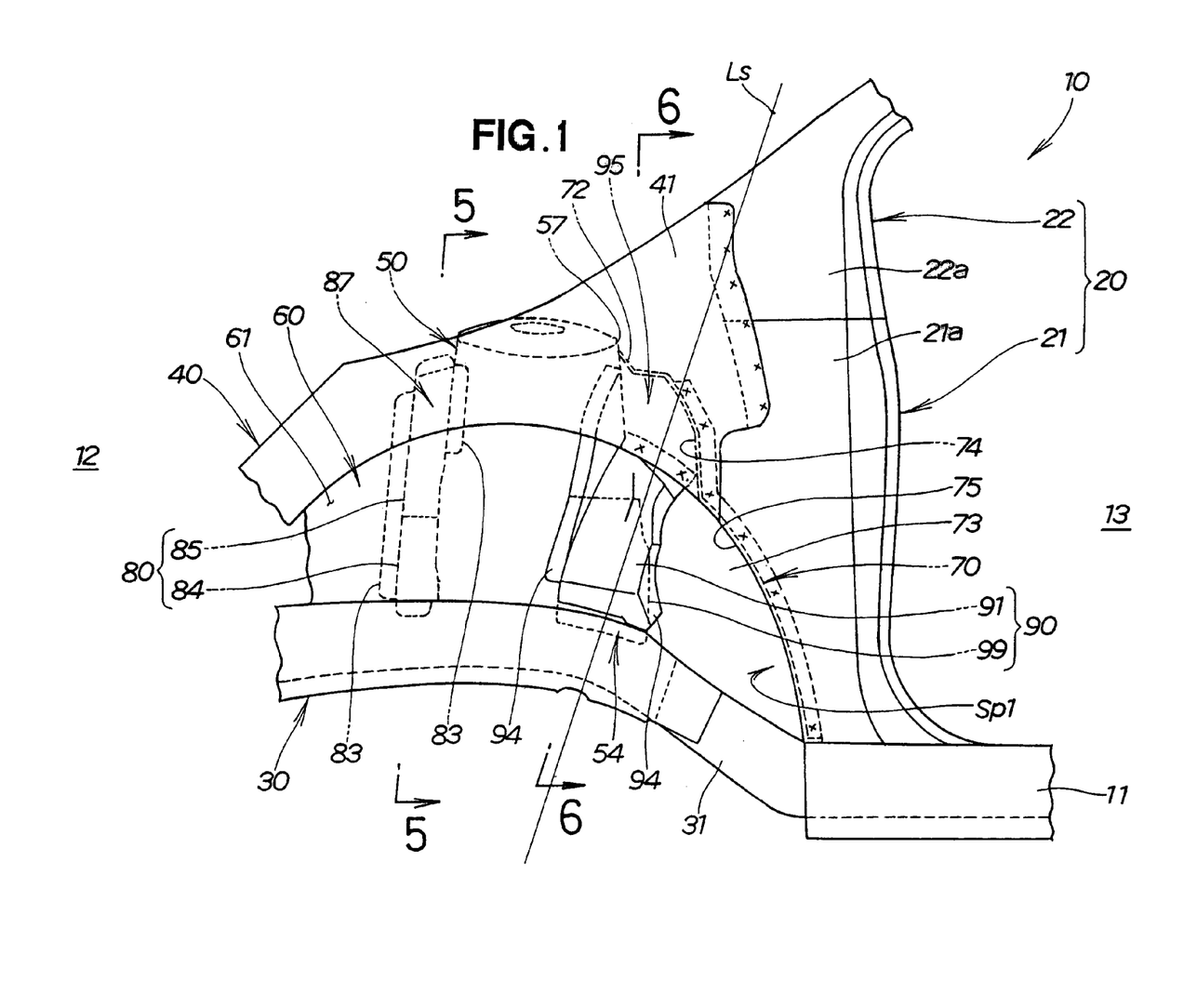
FIG. 1 is a left side elevation view of a front part of a vehicle body according to the present invention.
Figure 2:
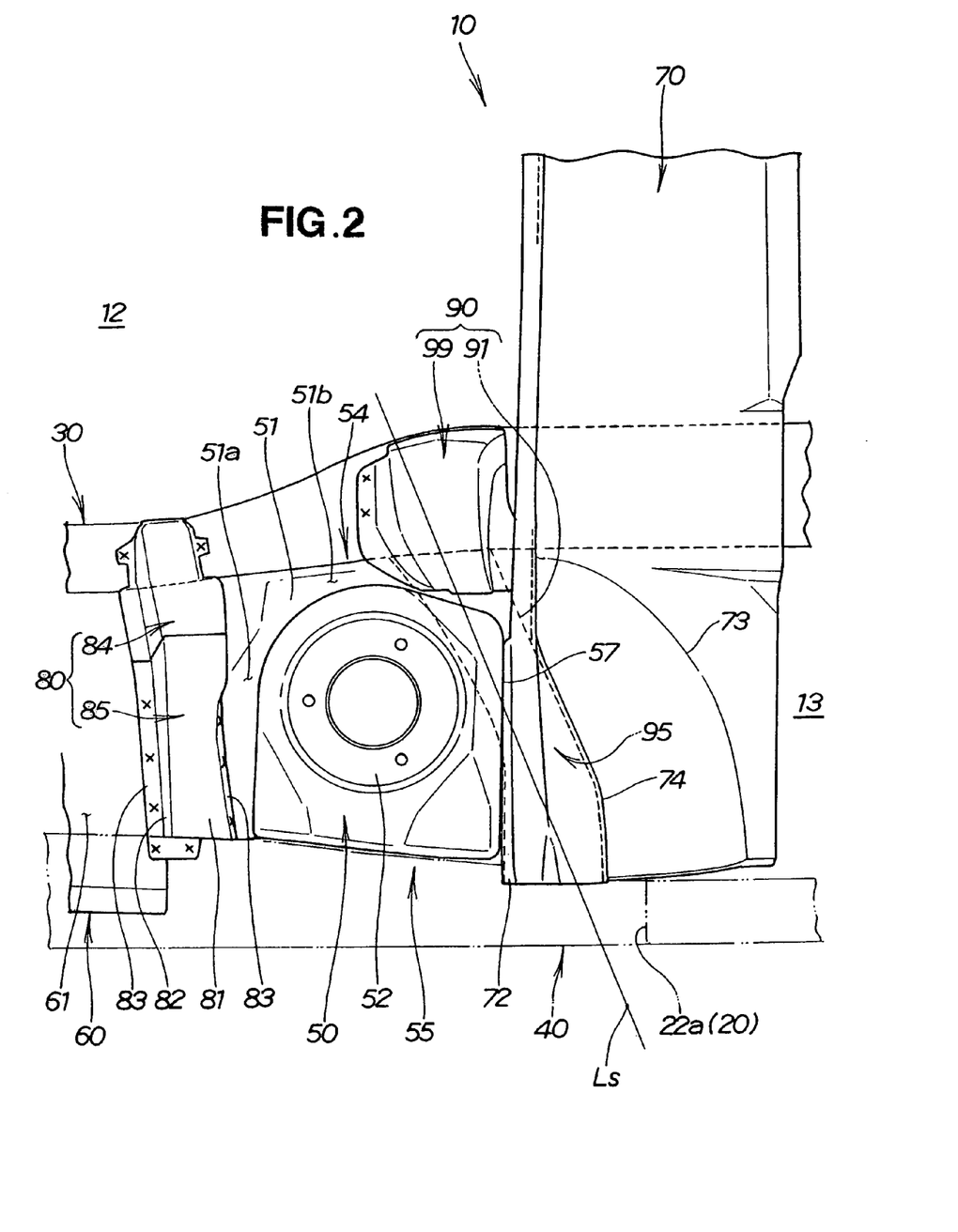
FIG. 2 is a plan view of a left half of the front part of the vehicle body.

Referring to FIG. 1 and FIG. 2, a vehicle body (i.e., a vehicle body frame) 10 of a vehicle such as an automobile is a monocoque body including right and left side sills 11, right and left front pillars 20, right and left front side frames 30, right and left front upper members 40, right and left front damper housings 50, right and left wheel houses 60 and a dashboard 70.

The right and left side sills 11 extend in a front-and-rear direction of the vehicle body 10 and are disposed on right and left sides of the vehicle body 10, respectively. The right and left front pillars 20 extend upwardly from front ends of the right and left side sills 11. The right and left front side frames 30 extend in the front-and-rear direction of the vehicle body 10 and are disposed on right and left sides of a front part of the vehicle body 10, respectively. The right and left front upper members 40 extend in the front-and-rear direction of the vehicle body 10 and are disposed transversely outwardly of and above the right and left front side frames 30, respectively. The right damper housing extends between the right front side frame and the right front upper member while the left front damper housing extends between the left front side frame and the left front upper member. The right and left wheel houses 60 are continuous with the right and left front damper housings 50, respectively. The dashboard 70 is disposed rearwardly of the right and left damper housings 50 and has parts each forming a rear half part of each of the right and left wheel houses 60.

The front side frame 30 will be hereinafter referred to as "side frame 30", the front upper member 40 will be hereinafter referred to as "upper member 40", and the front damper housing 50 will be hereinafter referred to as "damper housing 50".

As shown in FIG. 1, the left front pillar 20 includes a lower half or pillar lower member (also called "side panel") 21 disposed on a side of the side sill 11, and an upper half or pillar upper member 22 disposed on a side of a roof (not shown). The front pillar 20 is formed by joining the pillar lower member 21 and the pillar upper member 22 together. The front pillar 20 is otherwise a single piece with the pillar lower member 21 and the pillar upper member 22 being integral with each other.

The left side frame 30 has a rear end portion 31 slanted downwardly. The rear end portion 31 has a rear end joined to a floor frame (not shown). The left side frame 30 is a closed cross-sectional frame having a generally rectangular cross-section. The floor frame extends in the front-and-rear direction of the vehicle body 10 and supports a floor panel.

The left upper member 40 has a rear end portion 41 joined to both an upper end portion 21a of the pillar lower member 21 and a lower end portion 22a of the pillar upper member 22. The left upper member 40 is a closed cross-sectional member having a generally rectangular cross-section. The left upper member 40 extends obliquely downwardly and forwardly from the upper end portion 21a and the lower end portion 22a over the wheel house 60. The left upper member 40 may extend generally horizontally.

Figure 3:
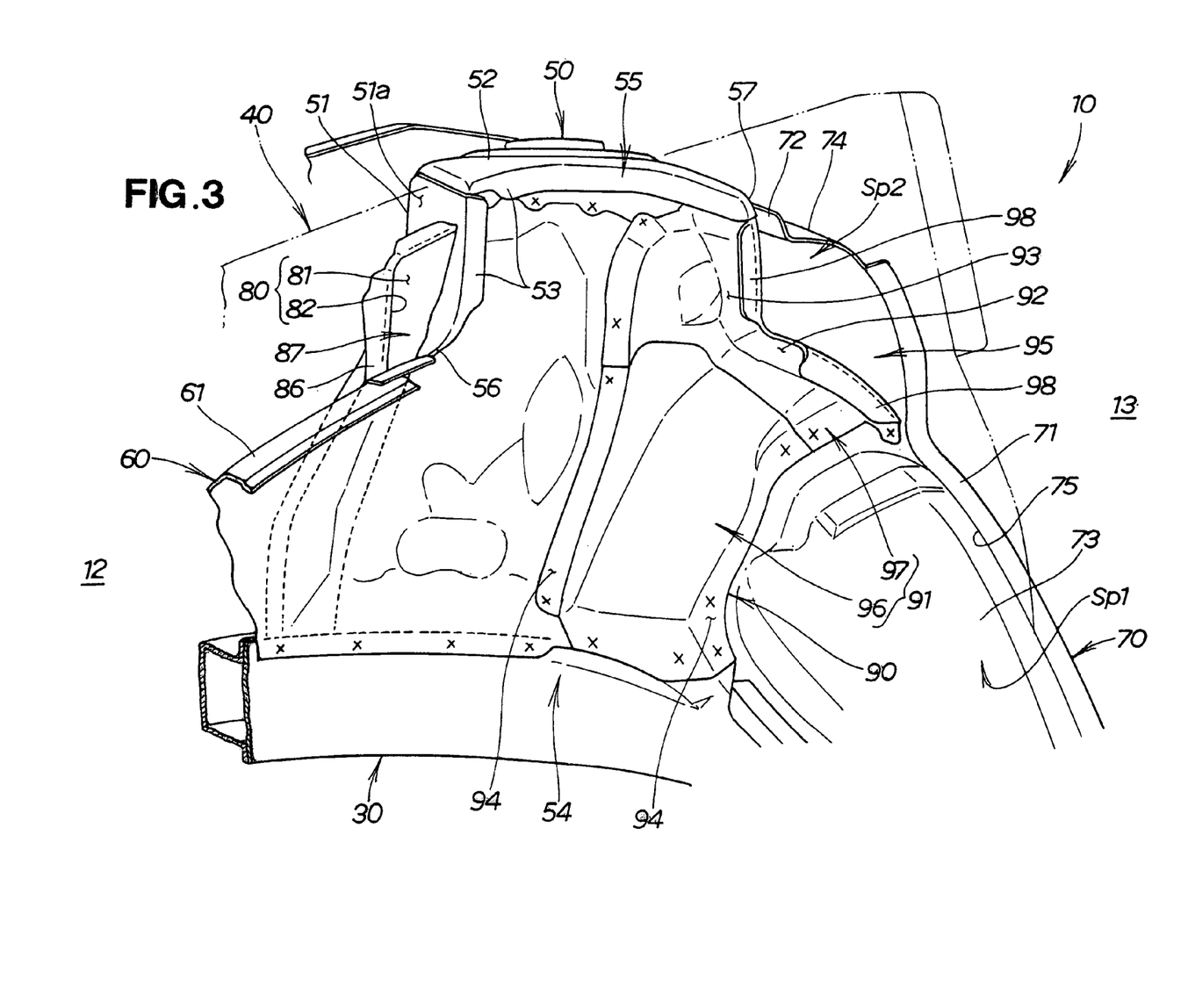
FIG. 3 is a perspective view of the left half of the front part of the vehicle body, as viewed from an upper left side of the vehicle body, with a left front upper member and a left front pillar omitted.

The left damper housing 50 supports a coil spring of a front suspension (not shown). The left damper housing 50 is made by subjecting a plate to press forming. As shown in FIG. 2 and FIG. 3, the left damper housing 50 includes a side plate 51 having a generally L-shaped configuration as viewed in top plan, and an upper plate 52 lying on the side plate 51. The side plate 51 has a front surface 51a and a side surface 51b facing in a transverse inward direction of the vehicle body 10.

Figure 4:
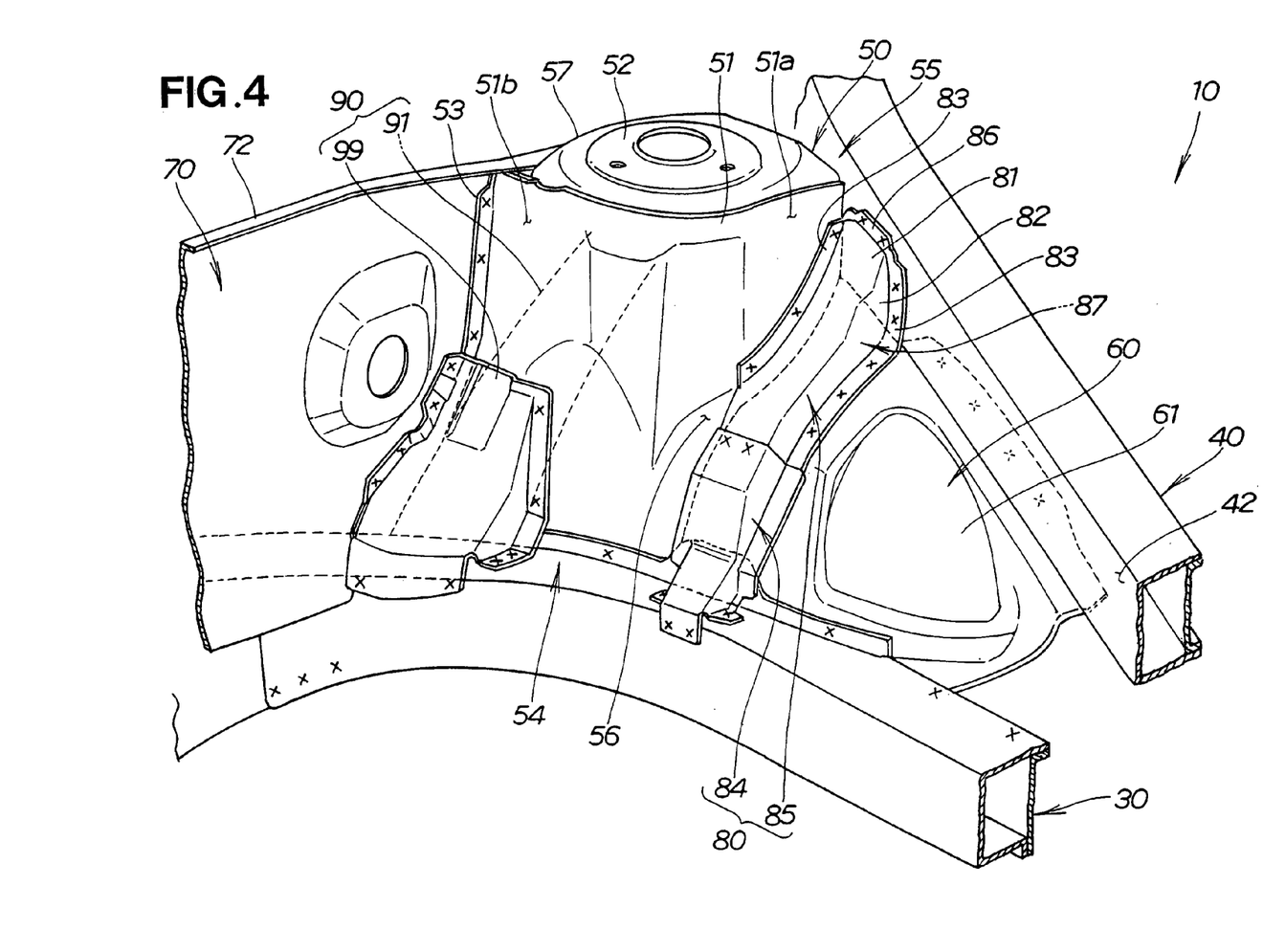
FIG. 4 is a perspective view of the left half of the front part of the vehicle body, as viewed from a front upper side of a transverse center of the vehicle body.

As shown in FIG. 3 and FIG. 4, the side plate 51 of the damper housing 50 has a lower end having an inner surface facing in the transverse inward direction and joined to an upper portion of the side frame 30. The damper housing 50 has side flanges 53, 53 (FIG. 3) facing in a transverse outward direction of the vehicle body 10. The side flanges 53, 53 of the damper housing 50 are joined to an inside surface 42 of the upper member 40. The inside surface 42 faces in the transverse inward direction of the vehicle body 10 or faces towards a transverse center of the vehicle body 10. The damper housing 50 has another side flange 53 (FIG. 4) joined to the dashboard 70. The damper housing 50 is joined to the side frame 30 at a joining portion 54. The joining portion 54 will be hereinafter referred to as "lower joining portion 54". Similarly, the damper housing 50 is joined to the upper member 40 at a joining portion 55. The joining portion 55 will be hereinafter referred to as "upper joining portion 55".

As shown in FIG. 3, the damper housing 50 has an extension portion 56 extending forwardly from the front surface 51a of the side plate 51 along an outline of the wheel house 60. The extension portion 56 lies on and is joined to a rear end of a front half part 61 of the wheel house 60.

As shown in FIG. 1 and FIG. 3, the dashboard 70 is disposed rearwardly of the damper housings 50 and, as will be described later, partly serves as the rear half part of each of the wheel houses 60. The dashboard 70 acts as a partitioning panel partitioning the front part of the vehicle body into a front portion defining an engine compartment 12 and a rear portion defining a passenger compartment 13. The dashboard 70 is made by subjecting a panel to press forming. More specifically, the dashboard 70 extends forwardly upwardly from front parts of the side sills and then extends generally vertically. The dashboard 70 has an upper end portion disposed adjacent rear parts of the right and left damper housings 50.

As shown in FIG. 3, the dashboard 70 has side flanges (only one of which is shown and designated at 71) at right and left ends thereof. The dashboard 70 has an upper flange 72 at a top end thereof. The dashboard 70 is bulged in a rearward direction of the vehicle body 10 at lower end portions of right and left end parts thereof. This bulged portion of the dashboard 70 will be hereinafter referred to as "lower bulged portion 73". The dashboard 70 is bulged in the rearward direction of the vehicle body 10 at upper end portions of the right and left end parts thereof. This bulged portion of the dashboard 70 will be hereinafter referred to as "upper bulged portion 74".

The lower bulged portion 73 and the upper bulged portion 74 are convexly curved configuration in the rearward direction of the vehicle body 10. The lower bulged portion 73 defines a space Sp1 at an inner or front side thereof and the upper bulged portion 74 defines a space Sp2 at an inner or front side thereof.

The lower bulged portion 73 has the convexly curved configuration opening downwardly and transversely outwardly of the vehicle body 10 for acting as the rear half part of the wheel house 60. The upper bulged portion 74 has the convexly curved configuration opening downwardly and transversely outwardly of the vehicle body 10 and is continuous with both the lower bulged portion 73 and the upper flange 72. As viewed from above (see FIG. 2), the upper bulged portion 74 tapers or decreases in width towards the transverse center of the vehicle body 10.

The vehicle body 10 includes right and left front side reinforcing members 80 (FIG. 2) provided along the front surfaces 51a of the side plates 51 of the right and left damper housings 50, respectively. The front side reinforcing member will be hereinafter referred to as "front reinforcing member 80". The vehicle body 10 also includes right and left rear side reinforcing members 90 (FIG. 2) provided along the rear parts 57 of the right and left damper housings 50. The rear side reinforcing member will be hereinafter referred to as "rear reinforcing member 90".

The left front reinforcing member 80 and the left rear reinforcing member 90 both extend between the left front side frame 30 and the left front upper member 40. Similarly, the right front reinforcing member and the right rear reinforcing member both extend between the right front side frame and the right front upper member.

The left front reinforcing member 80 and the left rear reinforcing member 90 will be explained below. Explanation of the right front reinforcing member and the right rear reinforcing member will be omitted because they have the same arrangement as the left ones.

The left front reinforcing member 80 has a generally inverted L-shaped cross-section, when viewed in side elevation or in the transverse inward direction of the vehicle body 10, as shown in FIG. 3. More specifically, the left front reinforcing member 80 has the inverted L-shaped configuration throughout the length thereof. The left front reinforcing member 80 includes a horizontal plate portion 81 extending forwardly from the front surface 51a of the damper housing 50, and a vertical plate portion 82 extending from a front edge of the horizontal plate portion 81 towards the wheel house 60.

The front reinforcing member 80 extends along the front surface 51a and a top surface of the extension portion 56 with side flanges 83, 83 of the front reinforcing member 80 joined to the front surface 51a and the top surface of the extension portion 56. The front reinforcing member 80 and the damper housing 50 jointly define a closed cross-sectional member 87 providing a generally quadrangular cross-section as viewed in side elevation.

Figure 5:
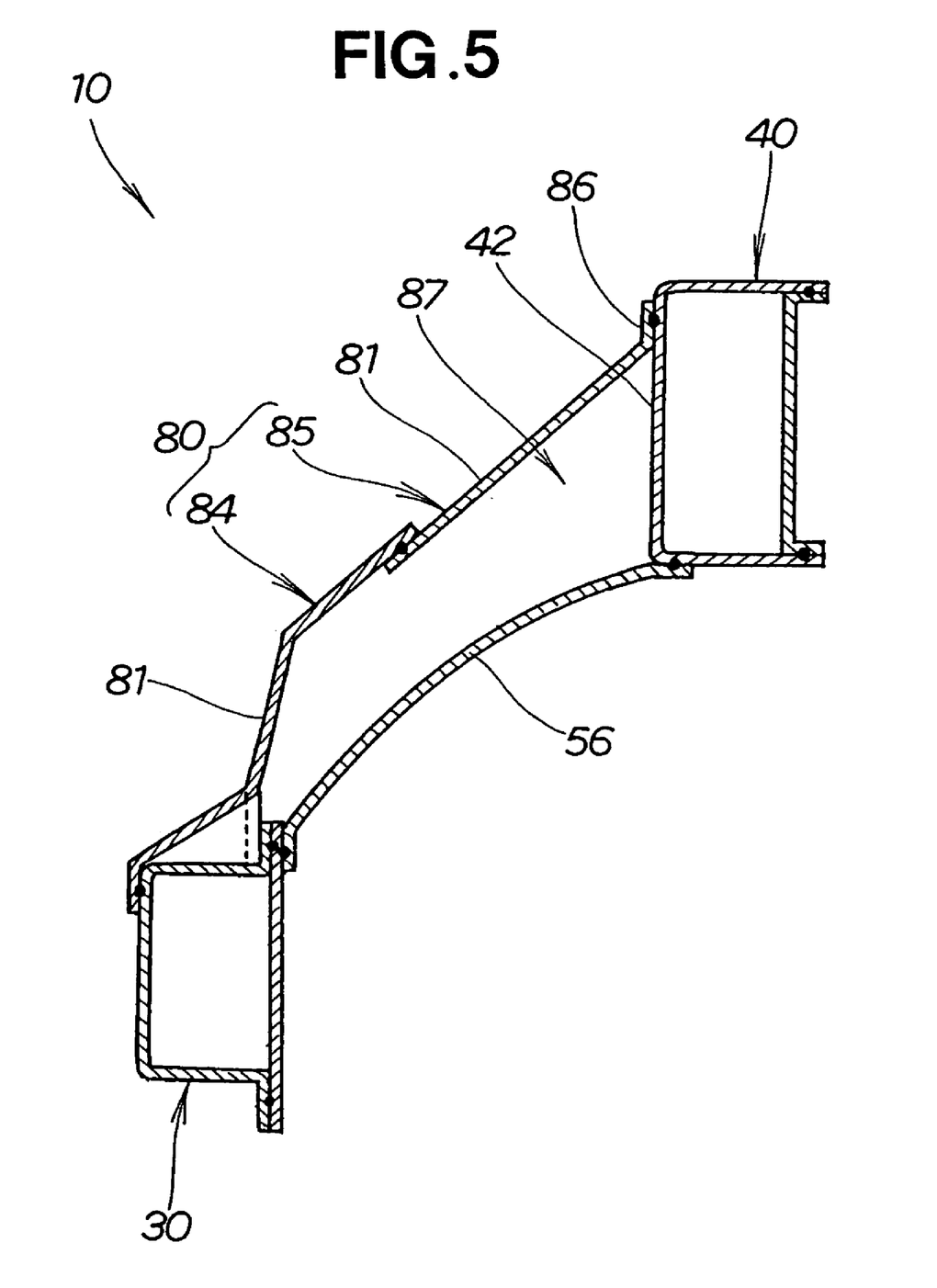
FIG. 5 is a cross-sectional view taken along line 5—5 of FIG. 1.

As shown in FIG. 4 and FIG. 5, the front reinforcing member 80 includes upper and lower halves, that is, a reinforcing lower half part 84 disposed on a side of the side frame 30, and a reinforcing upper half part 85 disposed on a side of the upper member 40. The reinforcing lower half part 84 and the reinforcing upper half part 85 are made by subjecting plates to press forming.

The reinforcing lower half part 84 has a lower end portion joined to the upper portion of the side frame 30. The reinforcing lower half part 84 has an upper end portion lying on and joined to a lower end portion of the reinforcing upper half part 85. The reinforcing upper half part 85 has an upper end portion or upper flange 86 joined to an upper portion (the inside surface 42) of the upper member 40. With this arrangement, the front reinforcing member 80 extends between the side frame 30 and the upper member 40.

Figure 6:
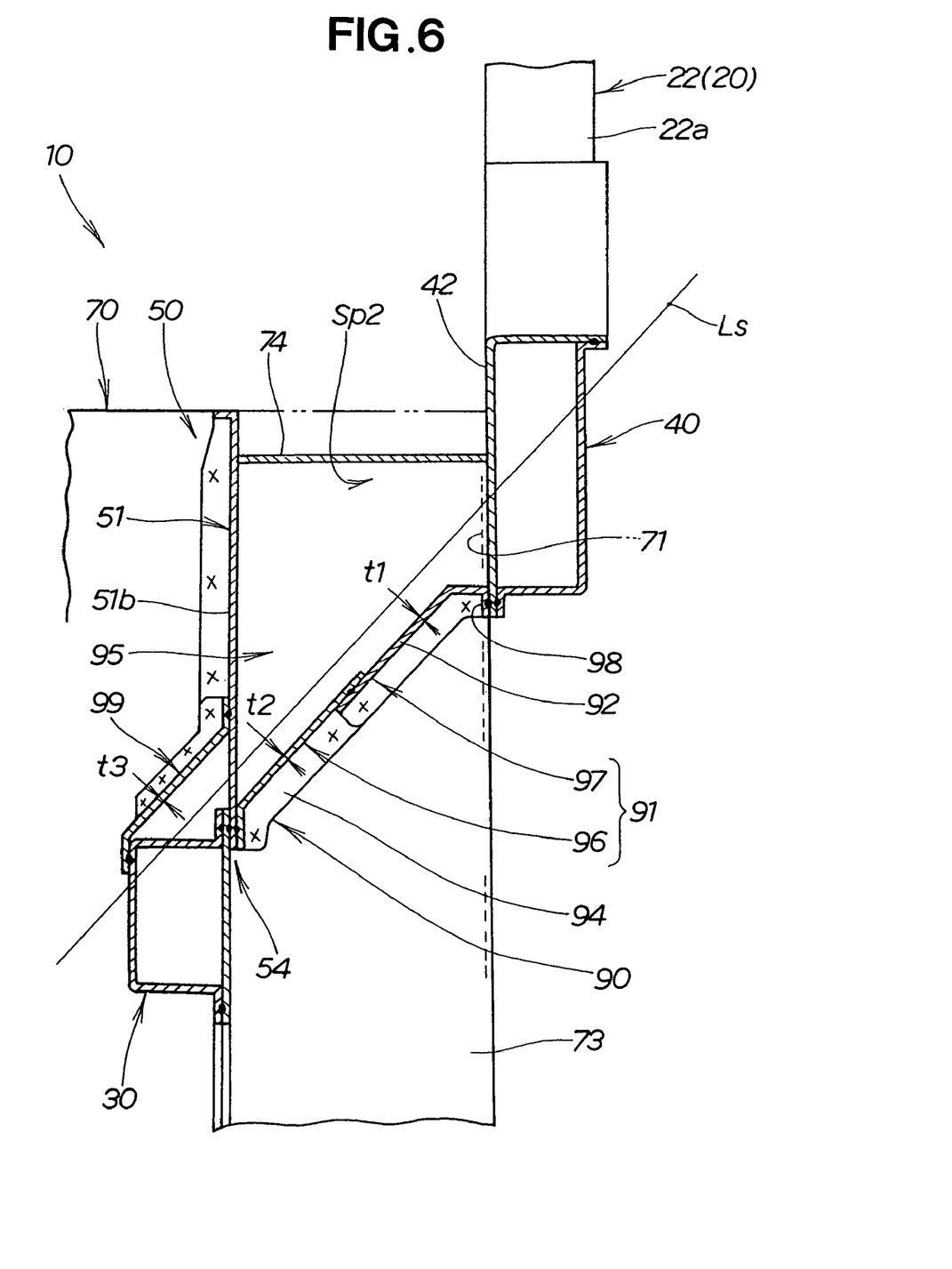
FIG. 6 is a cross-sectional view taken along line 6—6 of FIG. 1.

The left rear reinforcing member 90 will be explained. As shown in FIG. 1, FIG. 2 and FIG. 6, the left rear reinforcing member 90 extends between the lower joining portion 54 and the upper member 40. As best shown in FIG. 6, the rear reinforcing member 90 includes a first reinforcing part 91 disposed internally of the damper housing 50, and a second reinforcing part 99 disposed externally of the damper housing 50.

More specifically, the rear reinforcing member 90 is joined to the lower joining portion 54 located forwardly of the dashboard 70 and extends rearwardly upwardly from the lower joining portion 54 in the transverse outward direction of the vehicle body 10. The rear reinforcing member 90 has an upper end portion disposed internally of the upper bulged portion 74. The upper end portion of the rear reinforcing member 90 has a tip end joined to the inside surface 42 (FIG. 4 and FIG. 6) of the upper member 40 facing in the transverse inward direction of the vehicle body 10. The rear reinforcing member 90 is joined to the rear part 57 of the damper housing 50 therealong.

As shown in FIG. 3, the first reinforcing part 91 of the rear reinforcing member 90 has a generally L-shaped cross-section, when viewed in the transverse inward direction of the vehicle body 10. More specifically, the first reinforcing part 91 has the generally L-shaped configuration throughout the length thereof. The first reinforcing part 91 includes a horizontal plate portion 92 extending in the front-and-rear direction of the vehicle body 10 and disposed in the vicinity of a boundary between the lower bulged portion 73 and the upper bulged portion 74. The first reinforcing part 91 further includes a vertical plate portion 93 connected to a front edge of the horizontal plate portion 92 and extending along the rear part 57 of the damper housing 50. The horizontal plate portion 92 has an upper tip end disposed on an imaginary extension line (not shown) extending from an arc-shaped edge 75 located at a side end of the lower bulged portion 73.

The first reinforcing part 91 is disposed along the rear part 57 (a rear surface) of the damper housing 50 and an inner surface of the lower bulged portion 73 with side flanges 94, 94 of the first reinforcing part 91 joined to both an inner surface of the side plate 51 and the inner surface of the lower bulged portion 73. As shown in FIG. 3, the first reinforcing part 91, the damper housing 50 and the upper bulged portion 74 of the dashboard 70 are combined to form a closed cross-sectional member 95 having a generally quadrangular cross-section when viewed in side elevation (see FIG. 1 and FIG. 2, too). The vertical plate portion 93 serves as a rear side plate of the damper housing 50.

As shown in FIG. 3 and FIG. 6, the first reinforcing part 91 includes upper and lower halves, a reinforcing lower half portion 96 disposed on the side of the side frame 30 and a reinforcing upper half portion 97 disposed on the side of the upper member 40.

As shown in FIG. 6, the reinforcing lower half portion 96 has a lower end portion joined to the lower joining portion 54. The reinforcing lower half portion 96 has an upper end portion lying on and joined to a lower end portion of the reinforcing upper half portion 97. The reinforcing upper half portion 97 has an upper end portion or flange 98 joined to a lower portion of the upper member 40. With this arrangement, the first reinforcing part 91 extends between the side frame 30 and the upper member 40. More specifically, the side plate 51 of the damper housing 50 has a lower end portion placed on and joined to a flange or top end of the side frame 30. The reinforcing lower half portion 96 has the lower end portion placed on and joined to the lower end portion of the side plate 51 of the damper housing 50. The upper flange 98 or upper end portion of the reinforcing upper half portion 97 is placed on and joined to a flange or bottom end of the upper member 40 facing in the transverse inward direction of the vehicle body 10.

As shown in FIG. 6, the second reinforcing part 99 is disposed opposite from the first reinforcing part 91 with the side plate 51 of the damper housing 50 interposed therebetween. The second reinforcing part 99 is located at the lower joining portion 54. The second reinforcing part 99 is a gusset interconnecting the upper portion of the side frame 30 and the side surface 15b of the side plate 51 facing in the transverse inward direction of the vehicle body 10 (see also FIG. 1, FIG. 2 and FIG. 4).

As shown in FIG. 6, the reinforcing lower half portion 96, the reinforcing upper half portion 97 and the second reinforcing part 99 are made of plates. More specifically, they are made by subjecting plates to press forming. The reinforcing upper half portion 97 has a thickness t1 smaller than both a thickness t2 of the reinforcing lower half portion 96 and a thickness t3 of the second reinforcing part 99 (t1<t2, t1<t3). For example, the thickness t1 is 1.2 mm, the thickness t2 is 1.6 mm and the thickness t3 is 1.6 mm.

As shown in FIG. 1 and FIG. 3, the side flange 71 is joined to the upper member 40, and the upper flange 72 is joined to the damper housing 50. The upper bulged portion 74 of the dashboard 70 is connected through the side flange 71 and the upper flange 72 to the upper member 40 and the damper housing 50.

The upper bulged portion 74 covers an upper portion of the rear reinforcing member 90 with a constant interval provided therebetween. In other words, there is defined the space Sp2 between the upper portion of the rear reinforcing member 90 and the upper bulged portion 74.

The upper bulged portion 74, the rear reinforcing member 90 and the damper housing 50 are combined to provide a combined structure forming the closed cross-sectional member 95 having the generally quadrangular cross-section as viewed in side elevation. The closed cross-sectional member 95 is directed towards the front pillar 20 and extends from the lower joining portion 54 to the upper member 40. The rear reinforcing member 90 and the closed cross-sectional member 95 extend in a generally straight line from the lower joining portion 54 to the upper member 40, as viewed in all of front elevation (see FIG. 6), top plan (see FIG. 2) and side elevation (FIG. 1). Namely, the rear reinforcing member 90 and the closed cross-sectional member 95 extend in a generally straight line in three dimensions.

If there is set a line Ls (hereinafter referred to as "reinforcing line Ls") directed towards the front pillar 20 and extending from the lower joining portion 54 to the upper member 40, the reinforcing line Ls is in the form of a straight line, as viewed in all of side elevation (FIG. 1), top plan (FIG. 2) and front elevation (FIG. 6). The rear reinforcing member 90 and the closed cross-sectional member 95 extend from the lower joining portion 54 to the upper member 40 along the reinforcing line Ls. That is, the reinforcing member 90 and the closed cross-sectional member 95 are on the reinforcing line Ls.

The upper member 40 varies in configuration of cross-section at a portion located between a front part providing a cross-section shown in FIG. 4 and such a part joined to the rear reinforcing member 90 as to provide a cross-section shown in FIG. 6.

Next, discussion will be made as to how the front part of the vehicle body 10 operates.

Figure 7A:
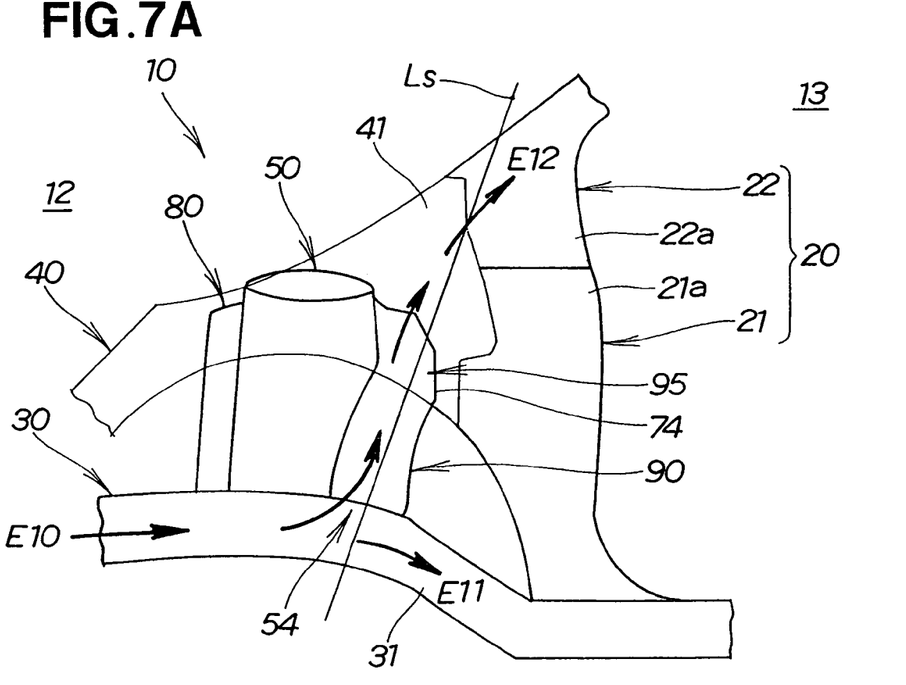
FIG. 7A is a view corresponding to FIG. 1, showing how the front part of the vehicle body is operated when a collision energy is applied to the front part of the vehicle body.

As shown in FIG. 7A, a collision energy E10 applied to the side frame 30 from a front side of the vehicle body 10 is divided into a collision energy E11 to be transmitted to the rear end portion 31 of the side frame 30 and a collision energy E12 to be transmitted to the front pillar 20 through the generally linearly extending, closed cross-sectional member 95 and the upper member 40. By the division of the collision energy E10, the collision energy E11 to be transmitted to the rear end portion 31 of the side frame 30 is small.

Since the rear reinforcing member 90 extends from the lower joining portion 54, where the damper housing 50 is joined to the side frame 30, to the upper member 40 and the rear reinforcing member 90 is joined to the rear part 57 of the damper housing 50 therealong, the damper housing 50 is sufficiently reinforced.

Since the damper housing 50 is sandwiched between and reinforced by the front and rear reinforcing members 80, 90, that is, since the damper housing 50 has front and rear parts reinforced by the front reinforcing member 80 and the rear reinforcing member 90, respectively, the damper housing 50 can have increased rigidity.

The upper end portion (i.e., the upper bulged portion 74) of the dashboard 70 is adjacent to the rear part 57 of the damper housing 50, is bulged in the rearward direction of the vehicle body 10, and covers the upper portion of the rear reinforcing member 90 with the constant interval provided therebetween. The upper bulged portion 74 is connected to the upper member 40 and the damper housing 50 via the side flange 71 and the upper flange 72. The combined structure formed by the combination of the rear reinforcing member 90, the upper bulged portion 74 and the damper housing 50 forms the closed cross-sectional portion 95 directed towards the front pillar 20 and extending from the lower joining portion 54 to the upper member 40.

The upper bulged portion 74, constituting one part of the dashboard 70, the rear reinforcing member 90 and the damper housing 50 jointly form the closed cross-sectional member 95 acting as a reinforcing member. The upper bulged portion 74 constitutes one part of the closed cross-sectional portion 95.

As shown in FIG. 1 and FIG. 2, the lower joining portion 54 where the damper housing 50 is joined to the side frame 30 is located forwardly of the dashboard 70. The upper bulged portion 74 is bulged rearwardly from a top end of the dashboard 70. The rear reinforcing member 90 having a lower end portion joined to the lower joining portion 54 located forwardly of a lower part of the dashboard 70 extends to the inside of the upper bulged portion 74 of the dashboard 70. By thus extending to inside the upper bulged portion 74, the rear reinforcing member 90 can be arranged to extend between the side frame 30 and the upper member 40 on a rear side of the damper housing 50, with the dashboard 70 located adjacent the rear parts of the right and left damper housings 50.

Figure 7B:
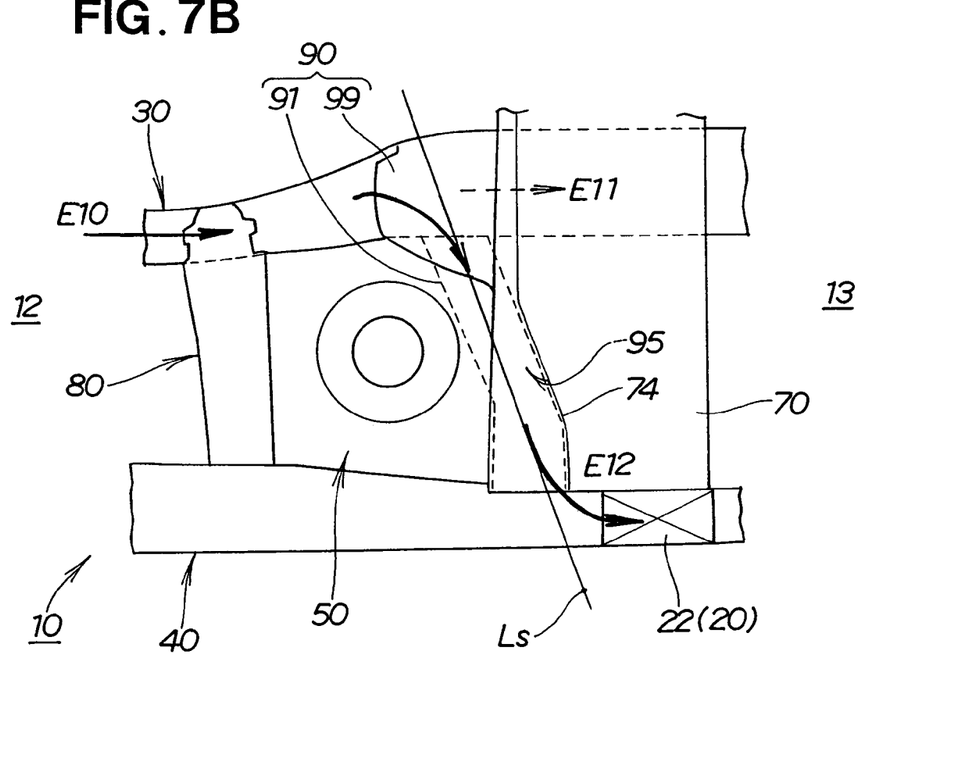
FIG. 7B is a view corresponding to FIG. 2, showing how the front part of the vehicle body is operated when the collision energy is applied to the front part of the vehicle body.

With the front part structure of the vehicle body as discussed above, there can be obtained the following advantages: (1) the collision energy E10 (FIG. 7A and FIG. 7B) applied to the front side frame 30 from the front side of the vehicle body 10 can be distributed towards the front pillar 90 through the rear reinforcing member 90 and the upper member 40; (2) the damper housing 50 can be reinforced by the rear reinforcing member 90; and (3) the dashboard 70 partitioning the front part of the vehicle body 10 into the engine compartment 12 and the passenger compartment 13 can be in a forwardly shifted position or adjacent to the rear part 57 of each of right and left the damper housings to enlarge the passenger compartment 13.

Because the closed cross-sectional member 95 generally linearly extends from the lower joining portion 54 to the upper member 40, as viewed in all of front elevation, top plan and side elevation, the collision energy E10 applied to the side frame 30 from the front side of the vehicle body 10 can be efficiently distributed to the front pillar 20 through the closed cross-sectional member 95 and the upper member 40. Therefore, the collision energy E10 can be efficiently dispersed.

Since the collision energy E10 is sufficiently distributed to the side frame 30 and the front pillar 20, the collision energy E10 can be absorbed by the front part of the vehicle body 10 with increased efficiency. As a result, the collision energy E10 applied to the passenger compartment side can be alleviated.

Further, as shown in FIG. 6, the rear reinforcing member 90 includes the two parts, that is, the first reinforcing part 91 provided inside the damper housing 50, and the second reinforcing part 99 provided outside the damper housing 50 and oppositely from the first reinforcing part 91 with the side plate 51 of the damper housing 50 interposed therebetween. The second reinforcing part 99 is the gusset located at the lower joining portion 54 and interconnecting the upper portion of the side frame 30 and a side portion (the side plate 51) of the damper housing 50 facing towards the transverse center of the vehicle body 10.

As shown in FIG. 1 and FIG. 2, the rear reinforcing member 90 extends from the lower joining portion 54, located forwardly of the lower part of the dashboard 70, through the inside of the upper bulged portion 74 of the dashboard 70 to the upper member 40. The rear reinforcing member 90 extends generally linearly as viewed in all of front elevation, top plan and side elevation, or extends generally linearly in three dimensions. Such a rear reinforcing member 90 can be simply made by the combination of the first and second reinforcing parts 91, 99.

As shown in FIG. 6, the first reinforcing part 91 includes the reinforcing upper half portion 97 located on the side of the upper member 40 and the reinforcing lower half portion 96 located on the side of the side frame 30. Since the thickness t1 of the reinforcing upper half portion 97 is smaller than the thickness t2 of the reinforcing lower half portion 96 and the thickness t3 of the second reinforcing part 99, the reinforcing upper half portion 97 can be smaller in strength than the reinforcing lower half portion 96 and the second reinforcing part 99. The thus arranged rear reinforcing member 90 has such a suitable strength as to achieve an optimal proportion of the collision energy E12 to be transmitted from the side frame 30 to the front pillar 20 to the collision energy E10 applied to the side frame 30 from the front side of the vehicle body 10. This results in increased freedom to design the vehicle body 10.

A front part structure of a vehicle body according to the present invention is suitable for a vehicle such as a car including right and left front side frames disposed right and left sides of a front part of the vehicle body, respectively, and extending in a front-and-rear direction of the vehicle body, right and left front upper members disposed transversely outward of and above the right and left front side frames, respectively, and extending in the front-and-rear direction of the vehicle body, right and left front pillars joined to rear end portions of the right and left front upper members, right and left front damper housings extending between the right front side frame and the right front upper member and between the left front side frame and the right front upper member, respectively, and a dashboard disposed rearwardly of the right and left front damper housings and partitioning the front part of the vehicle body into an engine compartment defined forwardly of the dashboard and a passenger compartment defined rearwardly of the dashboard.

Obviously, various minor changes and modifications of the present invention are possible in the light of the above teaching. It is therefore to be understood that within the scope of the appended claims the invention may be practiced otherwise than as specifically described.

What is claimed is:

1. A front part structure of a vehicle body, comprising:
right and left front side frames disposed on right and left sides of a front part of the vehicle body, respectively, and extending in a front-and-rear direction of the vehicle body;
right and left front upper members disposed transversely outwardly of and above the right and left front side frames, respectively, and extending in the front-and-rear direction of the vehicle body;
right and left front pillars joined to right and left rear end portions of the right and left front upper members, respectively;
right and left front damper housings extending between the right front side frame and the right front upper member and between the left front side frame and the left upper member, respectively;
a dashboard disposed rearwardly of the right and left front damper housings and partitioning the front part of the vehicle body into an engine compartment defined forwardly of the dashboard and a passenger compartment defined rearwardly of the dashboard;
right and left reinforcing members extending between the right front upper member and a right joining portion where the right front side frame and the right front damper housing are joined together and between the left front upper member and a left joining portion where the left front side frame and the left front damper housing are joined together, respectively;
the right and left reinforcing members being joined to rear parts of the right and left front damper housings therealong;
the dashboard being adjacent to the rear parts of the right and left front damper housings;
the dashboard having an upper end portion bulged in a rearward direction of the vehicle body, the bulged upper end portion of the dashboard covering each of upper portions of the right and left reinforcing members with a constant interval provided therebetween;
the bulged upper end portion of the dashboard being joined to the right and left front upper members and the right and left front damper housings;
the right and left reinforcing members being combined with the bulged upper end portion of the dashboard to form right and left closed cross-sectional members, the right closed cross-sectional member being directed towards the right front pillar and extending from the right joining portion to the right front upper member, the left closed cross-sectional member being directed towards the left front pillar and extending from the left joining portion to the left front upper member; and the right and left closed cross-sectional members each taking the form of a substantially straight line as viewed in all of front elevation, top plan and side elevation.

2. A front part structure of a vehicle body according to claim 1, wherein the right and left reinforcing members include right and left first reinforcing parts provided inside the right and left front damper housings, respectively, and right and left second reinforcing parts provided outside the right and left front damper housings, respectively, the right second reinforcing part being located oppositely from the right first reinforcing part with a side plate of the right front damper housing interposed therebetween, the left second reinforcing part being located oppositely from the left first reinforcing part with a side plate of the left front damper housing interposed therebetween, the right and left second reinforcing parts being gussets located at the right and left joining portions, the gussets interconnecting an upper portion of the right front side frame and a side portion of the right front damper housing facing towards a transverse center of the vehicle body and interconnecting an upper portion of the left front side frame and a side portion of the left front damper housing facing towards the transverse center of the vehicle body.

3. A front part structure of a vehicle body according to claim 2, wherein the right and left first reinforcing parts include right and left reinforcing lower half portions made of plates and disposed on sides of right and left front side frames, respectively, and right and left reinforcing upper half portions made of plates and disposed on sides of right and left front upper members, respectively, the reinforcing upper half portions being smaller in thickness than the reinforcing lower half portions and the second reinforcing parts made of plates.

* * * * *